M. L. AKERS.
DEVICE FOR HOLDING TEETH IN AGRICULTURAL IMPLEMENTS.
APPLICATION FILED JUNE 21, 1912.
1,050,710.
Patented Jan. 14, 1913.
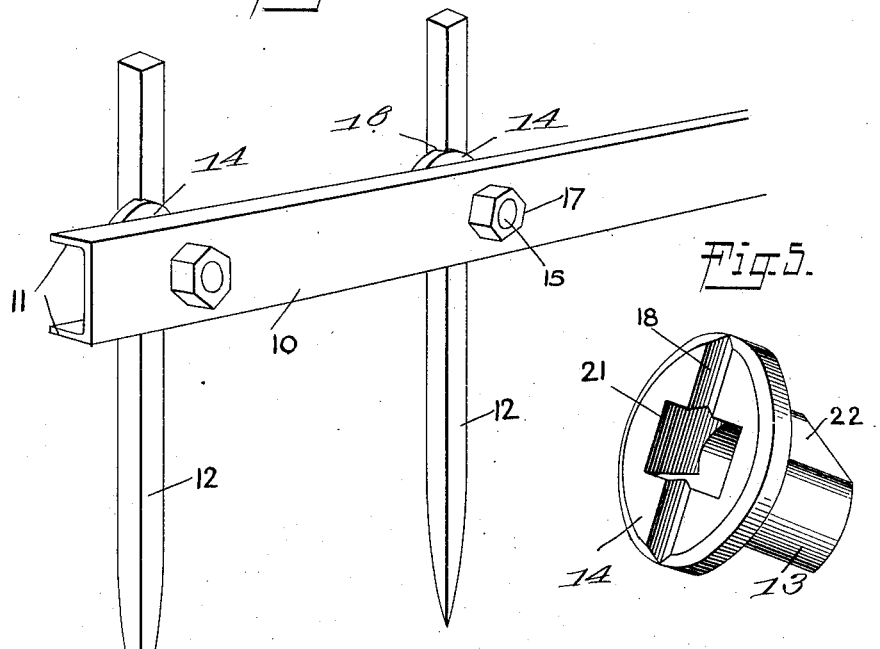
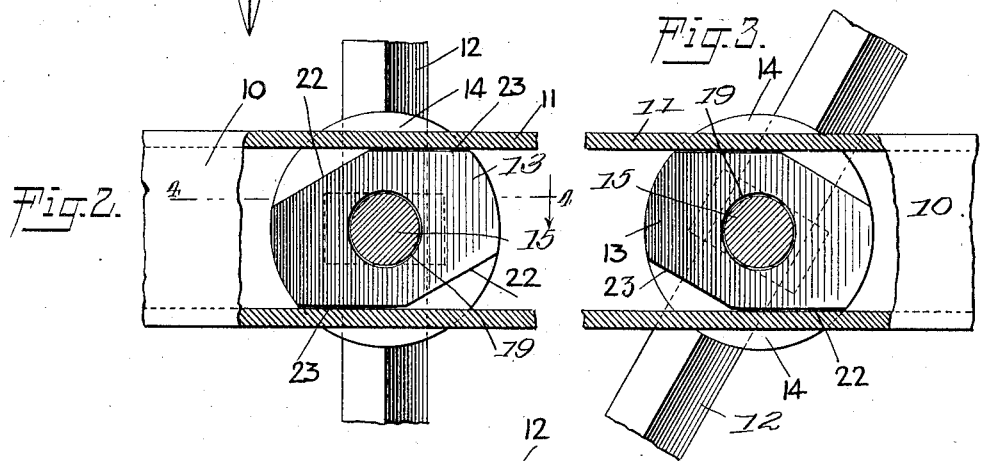
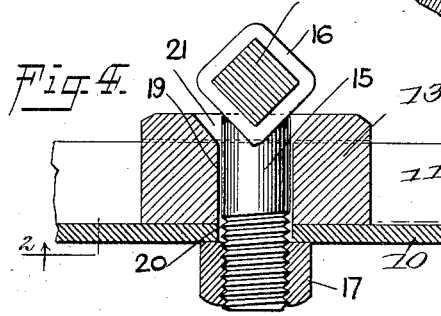
WITNESSES
INVENTOR
Maurice L. Akers
BY
ATTORNEYS

UNITED STATES PATENT OFFICE.

MAURICE LEONARD AKERS, OF PENDLETON, OREGON, ASSIGNOR TO PENDLETON IRON WORKS, OF PENDLETON, OREGON, A CORPORATION.

DEVICE FOR HOLDING TEETH IN AGRICULTURAL IMPLEMENTS.

1,050,710.  Specification of Letters Patent.  Patented Jan. 14, 1913.

Application filed June 21, 1912. Serial No. 705,048.

*To all whom it may concern:*

Be it known that I, MAURICE L. AKERS, a citizen of the United States, and a resident of Pendleton, in the county of Umatilla and State of Oregon, have invented a new and Improved Device for Holding Teeth in Agricultural Implements, of which the following is a full, clear, and exact description.

My invention, although applicable to the teeth or shanks generally of agricultural implements, is more especially designed for holding the teeth of drag harrows against their supporting bars.

An object of the invention is to provide a novel holding and adjusting means whereby the teeth may be quickly and conveniently adjusted to be disposed perpendicularly to the frame bar of the harrow, or at an angle laterally to the line of draft. The arrangement is such that the adjustment will be uniform as to all the teeth on the bar.

The invention will be particularly explained in the specific description hereinafter to be given.

Reference is to be had to the accompanying drawings forming a part of this specification, in which similar characters of reference indicate corresponding parts in all the views.

Figure 1 is a rear view in perspective showing harrow teeth and a frame bar provided with my improved tooth-holding device; Fig. 2 is a detail with parts in section, on about the line 2—2 in Fig. 4, the tooth in said view being in the vertical position; Fig. 3 is a similar view with the tooth at a lateral angle to the line of draft; Fig. 4 is a horizontal section on about the line 4—4 in Fig. 2, and Fig. 5 is a perspective view of one of the holding blocks for the teeth.

My device is given a form to adapt it particularly to a frame bar 10 of channel iron, having vertically spaced horizontal flanges or lips 11, to which bar harrow teeth or the like, indicated by the numeral 12, are secured. The tooth-holding block comprises a body 13 and diametrically opposite flanges 14, the body of the block being received between the lips 11 of the frame bar, and the flanges 14 extending over the lips of the channel bar. A clamp bolt 15 is provided in connection with the block, said bolt having at one end an eye 16, which is usually angular, to conform to the cross section of the tooth
12, and the opposite end of the bolt receives a nut 17. The face of the holder block is formed with a recess 18 having inclined side walls, given a V-shape to receive an angle of the tooth, said groove extending across the face of the block and to the periphery of the flanges 14. The block has an axial bore 19, through which the bolt passes, and the frame bar 10 is formed with a bolt hole 20. The face of the holder block is recessed or countersunk, as at 21, adjacent to the axial bore 19, the countersink extending laterally at two sides at right angles to the groove 18, and the said recess or countersunk portion receiving the inner angular portion of the eye 16 when the nut 17 is turned home. The arrangement is such that a tightening of the nut will draw the bolt axially and bring the inner angle of the tooth 12 firmly to a seat in the groove 18, the angular eye 16 being partially received in the recess or countersink 21.

On the upper and lower sides, the body 13 of the holder block is formed with parallel faces 22 and additional parallel faces 23 at obtuse angles to the respective adjacent faces 22. The holder block is adapted to rock with the bolt as an axis to bring the parallel faces 23 to bear against the inner surfaces of the flanges or lips 11 of the frame bar 10, in which position the groove 18 will be disposed vertically and the teeth 12 will be similarly disposed. The vertical position of the teeth is adapted for general agricultural operations, but for weeding and other purposes, a lateral inclination of the teeth is made, as in Fig. 3, and this is effected by simply loosening the nut sufficiently to permit the holder block to be turned to bring the parallel faces 22 against the flanges of the frame bar, whereby the teeth will be brought to the angular position illustrated in Fig. 3.

It will be seen that the faces 22, 23, by contacting with the flange, determine the extent of turning or rocking movement permitted the holder block, so that the adjustment of the vertical or angular position of the teeth is effected with convenience and despatch, and uniformity of the adjustment results because all of the teeth will present the same lateral angle to the bar and the same position relatively to the line of draft.

The eye-bolt shown is a known expedient for securing harrow teeth, and it will be understood that I do not claim the same in itself; the eye-bolt is illustrated as one means for securing my improved block.

Having thus described my invention, I claim as new and desire to secure by Letters Patent:

A device for holding agricultural teeth, comprising a channel frame bar, a tooth-holding block, and a clamp bolt for securing the block to the bar, said block having a body received within the channel of the bar, and opposite flanges to bear against the flanges of the bar, the body of the block having two pairs of parallel faces, the faces of the respective pairs being at obtuse angles to each other, and the block being adapted to turn to bring either pair of faces against the flanges of the channel bar, the clamp bolts having an angular eye to receive the tooth, and the face of the holder block having a groove to receive an angle of the tooth, and a recess at right angles to the groove to receive the angular eye of the bolt.

In testimony whereof, I have signed my name to this specification in the presence of two subscribing witnesses.

MAURICE LEONARD AKERS.

Witnesses:
C. J. SMITH,
W. M. PETERSON.

---

Copies of this patent may be obtained for five cents each, by addressing the "Commissioner of Patents, Washington, D. C."